(12) United States Patent
Giterman

(10) Patent No.: US 7,137,297 B2
(45) Date of Patent: Nov. 21, 2006

(54) SYSTEM AND METHOD FOR NON-CONTACT FORMING OF PARTS TO A FLUID SENSOR ASSEMBLY

(75) Inventor: Igor Giterman, Woodbridge, CT (US)

(73) Assignee: Harco Laboratories, Inc., Branford, CT (US)

( * ) Notice: Subject to any disclaimer, the term of this patent is extended or adjusted under 35 U.S.C. 154(b) by 0 days.

(21) Appl. No.: 10/843,501

(22) Filed: May 11, 2004

(65) Prior Publication Data

US 2005/0252288 A1 Nov. 17, 2005

(51) Int. Cl.
*A63B 53/00* (2006.01)
*G01F 1/00* (2006.01)
(52) U.S. Cl. .................................. 73/170.02
(58) Field of Classification Search ............. 73/756, 73/861.65, 866.5, 736, 747, 170.02
See application file for complete search history.

(56) References Cited

U.S. PATENT DOCUMENTS

| | | | |
|---|---|---|---|
| 3,125,880 A * | 3/1964 | Oliveau .................. 73/861.65 |
| 3,520,049 A * | 7/1970 | Dudin et al. .............. 219/617 |
| 3,961,739 A | 6/1976 | Leftheris ................. 228/110 |
| 4,513,188 A | 4/1985 | Katzenstein .............. 219/9.5 |
| 4,807,351 A | 2/1989 | Berg et al. ................ 29/432 |
| 5,046,360 A * | 9/1991 | Hedberg ................... 73/182 |
| 5,253,674 A | 10/1993 | Argyle et al. ............. 137/559 |
| 5,981,921 A | 11/1999 | Yablochnikov ............ 219/603 |
| 6,389,697 B1 * | 5/2002 | Benoit et al. ............. 29/897.2 |
| 6,591,696 B1 * | 7/2003 | Bachinski ................ 73/861.65 |
| 6,892,584 B1 * | 5/2005 | Gilkison et al. ............. 73/736 |
| 2002/0121511 A1 * | 9/2002 | Yablochnikov ............ 219/603 |
| 2005/0193545 A1 * | 9/2005 | Kiehl ........................ 29/505 |

* cited by examiner

*Primary Examiner*—Max Noori
(74) *Attorney, Agent, or Firm*—St. Onge Steward Johnston & Reens LLC

(57) ABSTRACT

A method for coupling components of a fluid sensor assembly for a vehicle, the method comprising the steps of providing a body portion of a fluid sensor assembly with a joining section that has a mating surface, providing a head portion of a fluid sensor assembly with a joining section that has a mating surface, introducing the mating surface of the body portion joining section to the mating surface of the head portion joining section to define a overlapping configuration, providing a first magnetic field that opposes a second magnetic field to produce a force field, exposing the overlapped configuration to the force field that surpasses both joining sections' material yield strength without causing either joining section's material to flow and coupling together the mating surfaces of both joining sections of the overlapped configuration with the force field to form a fluid sensor assembly.

22 Claims, 10 Drawing Sheets

SYSTEM AND METHOD FOR NON-CONTACT FORMING OF PARTS TO A FLUID SENSOR ASSEMBLY

FIELD OF THE INVENTION

The present invention relates to manufacturing fluid data sensor assemblies and the joinery used in joining fluid data sensor components into a fluid data sensor assembly.

BACKGROUND OF THE INVENTION

Joining is a critical step in the fabrication of components in the aerospace industry. There are numerous techniques such as brazing, welding, mechanically forming, swaging and epoxy bonding presently available to join aircraft components together, but each of the available techniques has an attendant disadvantage for use in external aircraft assembly joinery.

For example, furnace brazing and welding techniques create at least three major disadvantages when used in external aircraft assembly joinery. The first disadvantage associated with furnace brazing and welding is that both techniques are labor intensive. The techniques are labor intensive because they both require a high degree of skill to accomplish the joinery without introducing serious defects into the joint.

The second disadvantage associated with furnace brazing and welding is that the techniques cannot satisfactorily join two dissimilar materials because of the risk of corrosion created by the metallic interaction between the two metals being joined. This inability to join dissimilar materials is a major disadvantage because the use of dissimilar materials for an external aircraft assembly can allow an aircraft assembly's design to be maximized. For example, in fluid data instruments it is desirable to construct the internal housing out of aluminum to reduce the overall component assembly weight, and to use stainless steel for the external probe end thereby providing a higher degree of corrosion and erosion resistance than if an aluminum probe end was utilized.

And the third disadvantage associated with furnace brazing and welding is that the techniques do not allow for finished parts to be joined without damage to the finished parts. The reason for the damage is because furnace brazing and welding need to introduce large quantities of heat for the techniques to be successfully employed thus degrading or destroying the finish on the finished parts that are to be joined. A look at the other present aircraft assembly techniques will also reveal the same, as well as other, limitations.

For instance, the technique of dip brazing can reduce the labor-intensive demands of the brazing and welding techniques. However, dip brazing still suffers from the limitations that the joint be made with similar materials and that the joint cannot be made using finished parts due to the amount of heat necessary to employ the technique.

Mechanical forming and swaging are plagued, just as all the aforementioned techniques, by the inability to fruitfully join finished parts. Both mechanical forming and swaging techniques will leave tool marks due to the physical contact between the finished part and the tool thereby requiring added workload to correct the marring effects of the tools. In addition, the mechanical forming technique suffers from an inherent technique limitation called spring-back. Spring-back is a result of the material's structural memory snapping back to shape after the work piece is released from the mechanical form. The consequences of spring-back are that it is difficult to achieve a strong mechanical bond and/or a sealed assembly using the mechanical forming technique.

Like mechanical forming, the technique of epoxy bonding also fails to achieve high strength attachment. Epoxy bonding also possesses other disadvantages that make it an undesirable technique for joining external aircraft components. For example, epoxy bonding does not work well on sensors equipped with heaters due to the degradation of the bonding materials by the heat source. As a result, fabrications using epoxy-bonding techniques will limit the operating temperature of an aircraft assembly. Another major disadvantage of the use of an epoxy bonding technique for external aircraft assemblies is that the epoxy bond can create an electrical discontinuity, which is not allowed due to a regulatory lightning strike requirement for external aircraft parts.

There are also alternatives to joinery such as one-piece investment casting or the use of assemblies using bolted flanges. However, both of these alternatives typically lead to heavier and more costly designs. Accordingly, there is frequently no alternative to using some type of joining process to achieve the desired configuration.

Consequently, what is needed is a method to overcome the present limitations on the manufacturing of aircraft assemblies with external applications that meet all the varying design criteria that are required. Criteria such as increased ease of fabrication, dissimilar material bonding, electrical continuity, higher strength bonding, expanded temperature capabilities, minimized mechanical stresses on parts, extended assembly life cycle, weight reduction, minimized part count and finished parts joining.

SUMMARY OF THE INVENTION

Accordingly, it is an object of the present invention to provide a method to join finished fluid data sensor components into a fluid data sensor assembly without damage to the finished components.

Another object of the present invention is to provide a joined fluid data sensor assembly, which can be fabricated out of dissimilar materials as well as similar materials. Still another object of the present invention is to provide a joined fluid data sensor assembly having the above characteristics and which effectively maintains electrical continuity.

Still yet another object of the present invention is to provide a fluid data sensor assembly having the above characteristics and which provides an extended fluid data sensor assembly life cycle.

Yet still another object of the present invention is to provide a method that increases the ease of fabrication of a fluid data sensor assembly and still provides a high strength joint. Still another object of the present invention is to provide a method for fabricating a joined fluid data sensor assembly having a reduced parts count as well as a reduction in the final assembly's weight.

And still yet another object of the present invention is to provide a method that will minimize mechanical stresses on the fluid data assembly component parts and will also provide the fluid data sensor assembly expanded temperature capabilities.

These and other objects of the present invention are achieved by magnetically forming the parts of a fluid data sensor assembly. The method comprises introducing a joining portion of a sensor tip to a joining portion of a sensor housing to realize an overlapping configuration. The overlapped portions of the sensor tip and sensor housing are then formed with a magnetic forming apparatus to form a sensor assembly. The method can be used wherein the sensor tip and sensor housing are finished components or where the sensor tip and sensor assembly are of dissimilar materials.

Examples of fluid data sensor assemblies that the method will work for are, Pitot tubes, Pitot/angle of attack sensors, angle of attack sensors, active optical system sensors, total air temperature sensors, outside air temperature sensors and other similar type fluid data probes. A fluid is a substance which, when in static equilibrium, cannot sustain a shear stress such as a liquid or gas and includes both compressible and incompressible gases.

The results of the method will produce an fluid data sensor assembly comprising a sensor with a joining portion and a sensor tip with a joining portion. The sensor assembly joining portion and the sensor tip joining portion are then placed in an overlapping configuration in which one joining portion surrounds the other joining portion, wherein the overlapped configuration is exposed to a magnetic field which joins the joining portions into a single sensor assembly.

The invention and its particular features and advantages will become more apparent from the following detailed description considered with reference to the accompanying drawings.

DETAILED DESCRIPTION OF THE DRAWINGS

Figure 1:
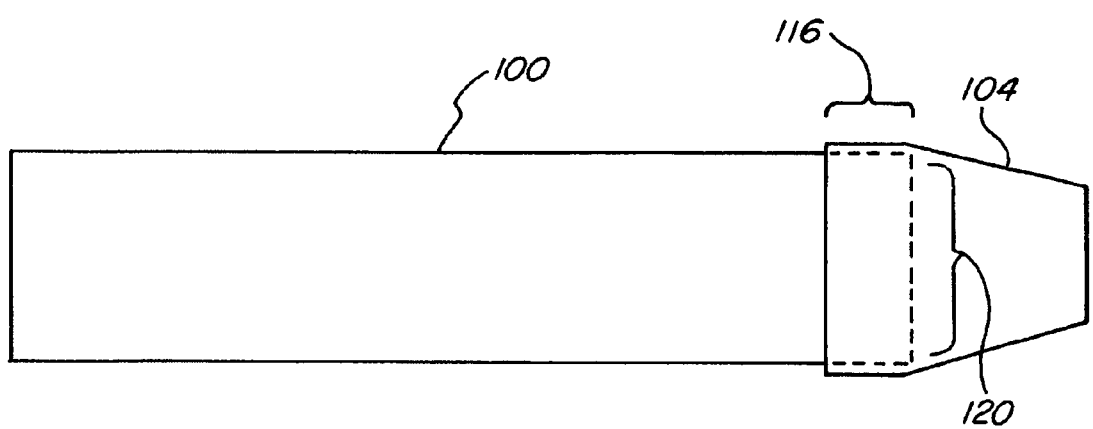
FIG. 1 is a perspective view of the component setup in the overlapping configuration for a fluid sensor assembly in accordance with the present invention.
Figure 9:
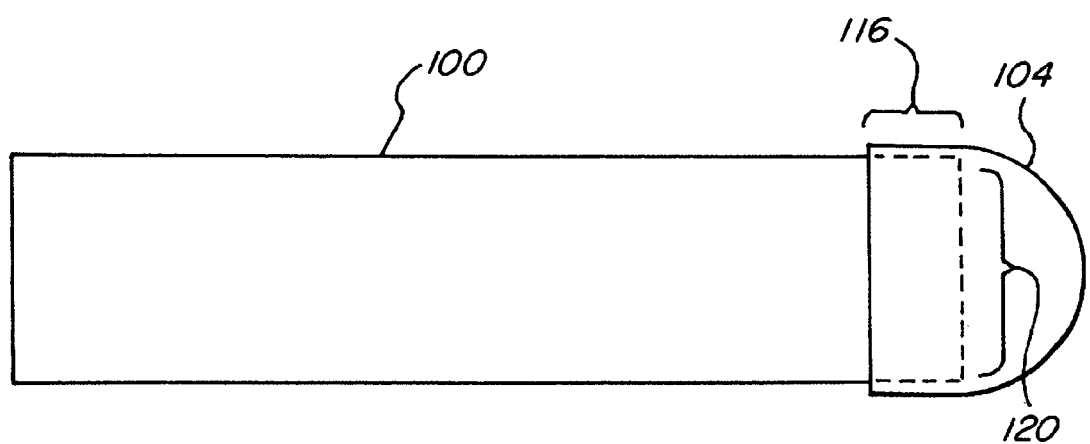
FIG. 9 is a perspective view of the component setup in the overlapping configuration for a fluid sensor assembly in accordance with the present invention of FIG. 1.

Referring first to FIGS. 1, 2, 9 and 10, the components of the fluid sensor assembly to be joined in accordance with the present invention are shown. Body portion 100 is shown in FIGS. 1 and 9 with its mating face 120 inserted into mating surface 116 of head section 104. This overlapping configuration can be a slip fit, a press fit or a loose fit. The shape of mating face 120 and mating surface 116 can be of various designs such as circular tubes, elliptical tubes, square tubes, rectangular tubes and the like.

Figure 2:
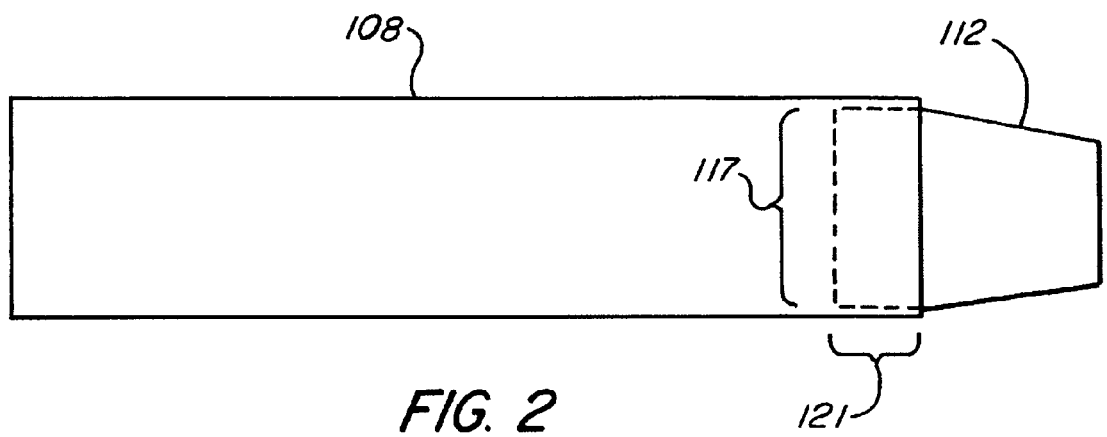
FIG. 2 is an alternative perspective view of the components setup in the overlapping configuration for a fluid sensor assembly in accordance with the present invention of FIG. 1.
Figure 10:
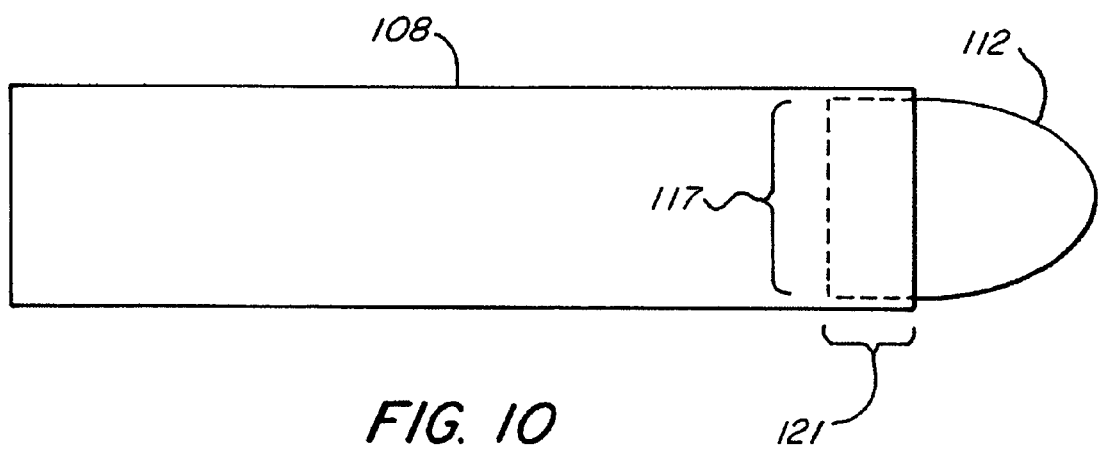
FIG. 10 is an alternative perspective view of the components setup in the overlapping configuration for a fluid sensor assembly in accordance with the present invention of FIG. 1.

FIGS. 2 and 10 shows an alternative overlapping configuration for the fluid data sensor assembly. In this alternative overlapping configuration, the head section 112 is shown with its mating face 117 inserted into the mating surface 121 of body portion 108. This overlapping configuration can also be a slip fit, a press fit or a loose fit as in the foregoing embodiment description. Also, the shape of mating surface 121 and mating face 117 can be of various designs such as circular tubes, elliptical tubes, square tubes, rectangular tubes and the like as in the foregoing embodiment description.

Figure 3:
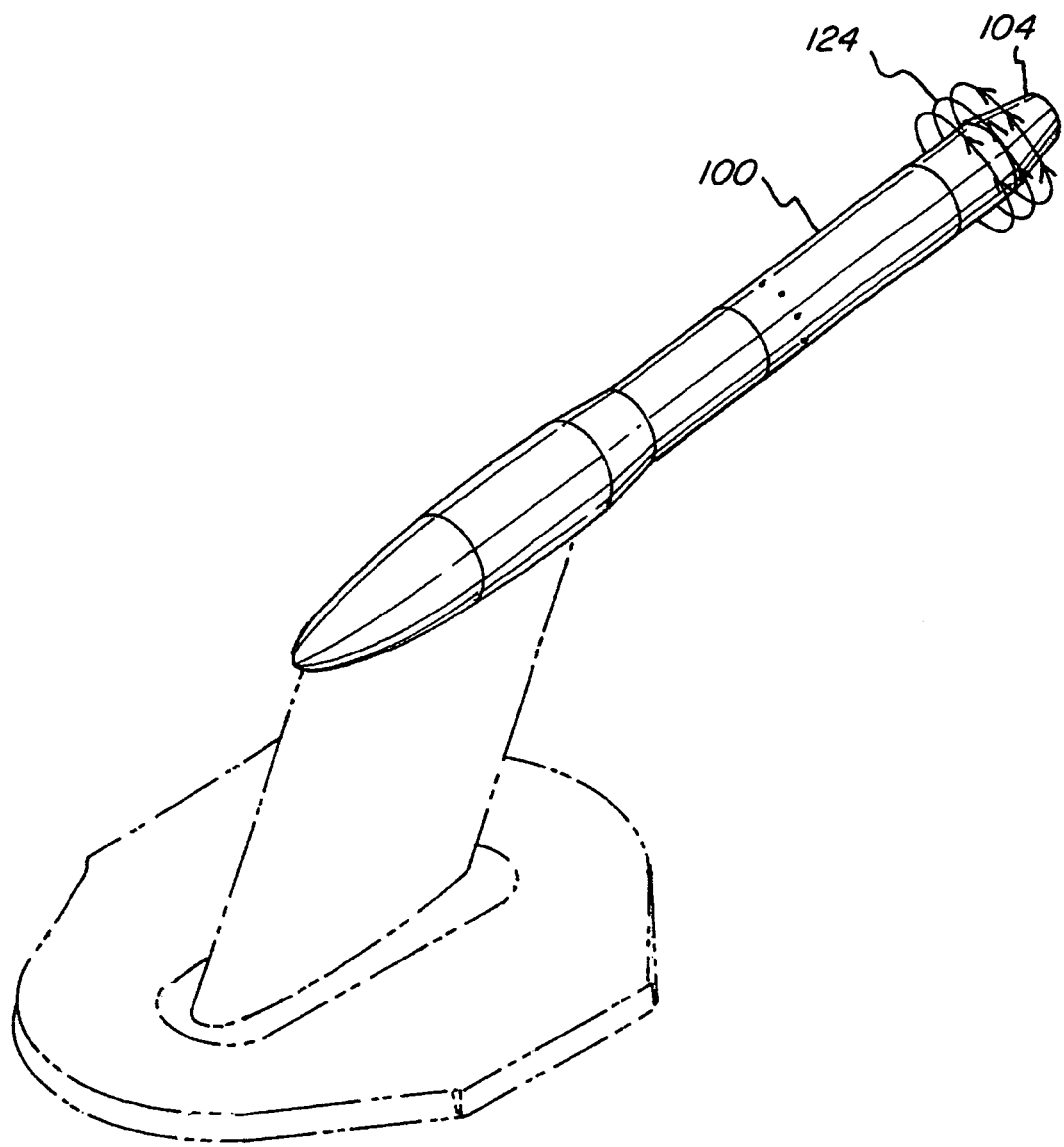
FIG. 3 is a perspective view of the components during the magnetic forming for a fluid sensor assembly in accordance with the present invention of FIG. 1.
Figure 4:
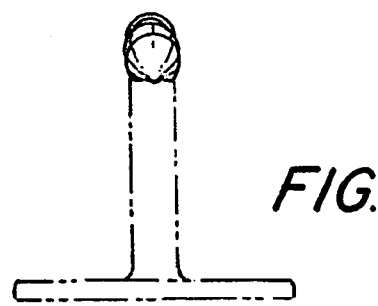
FIG. 4 is a rear perspective view of fluid sensor assembly using non-contact forming in accordance with the new design of FIG. 3.
Figure 5:
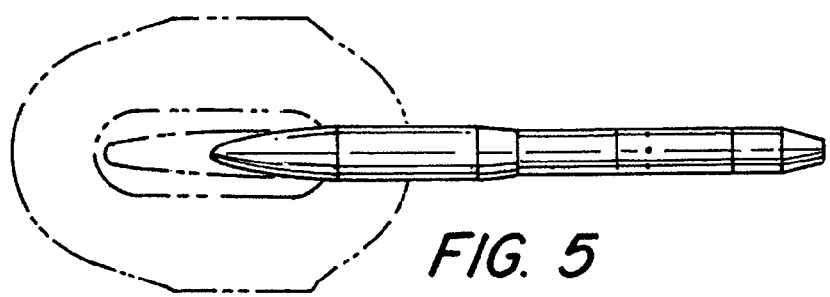
FIG. 5 is a top view of FIG. 3.
Figure 6:
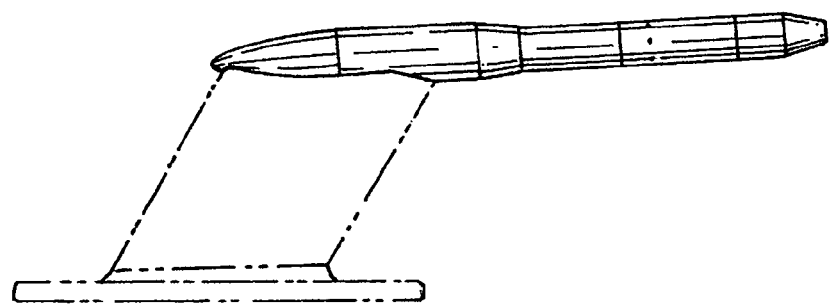
FIG. 6 is a side view of FIG. 3.
Figure 7:
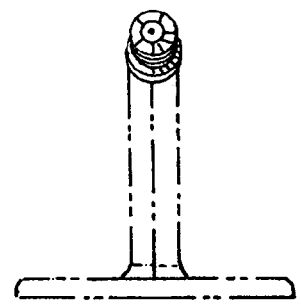
FIG. 7 is a front view of FIG. 3.
Figure 8:
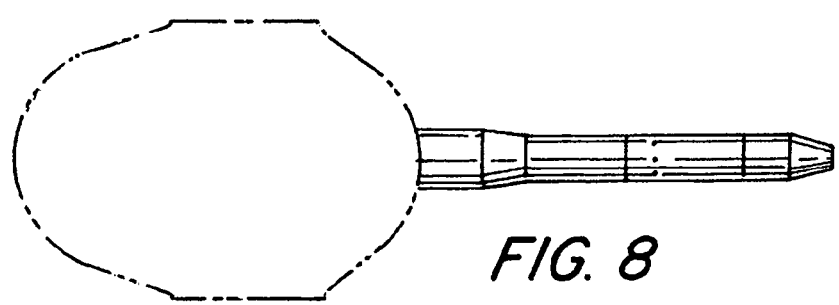
FIG. 8 is a bottom view of FIG. 3.
Figure 11:
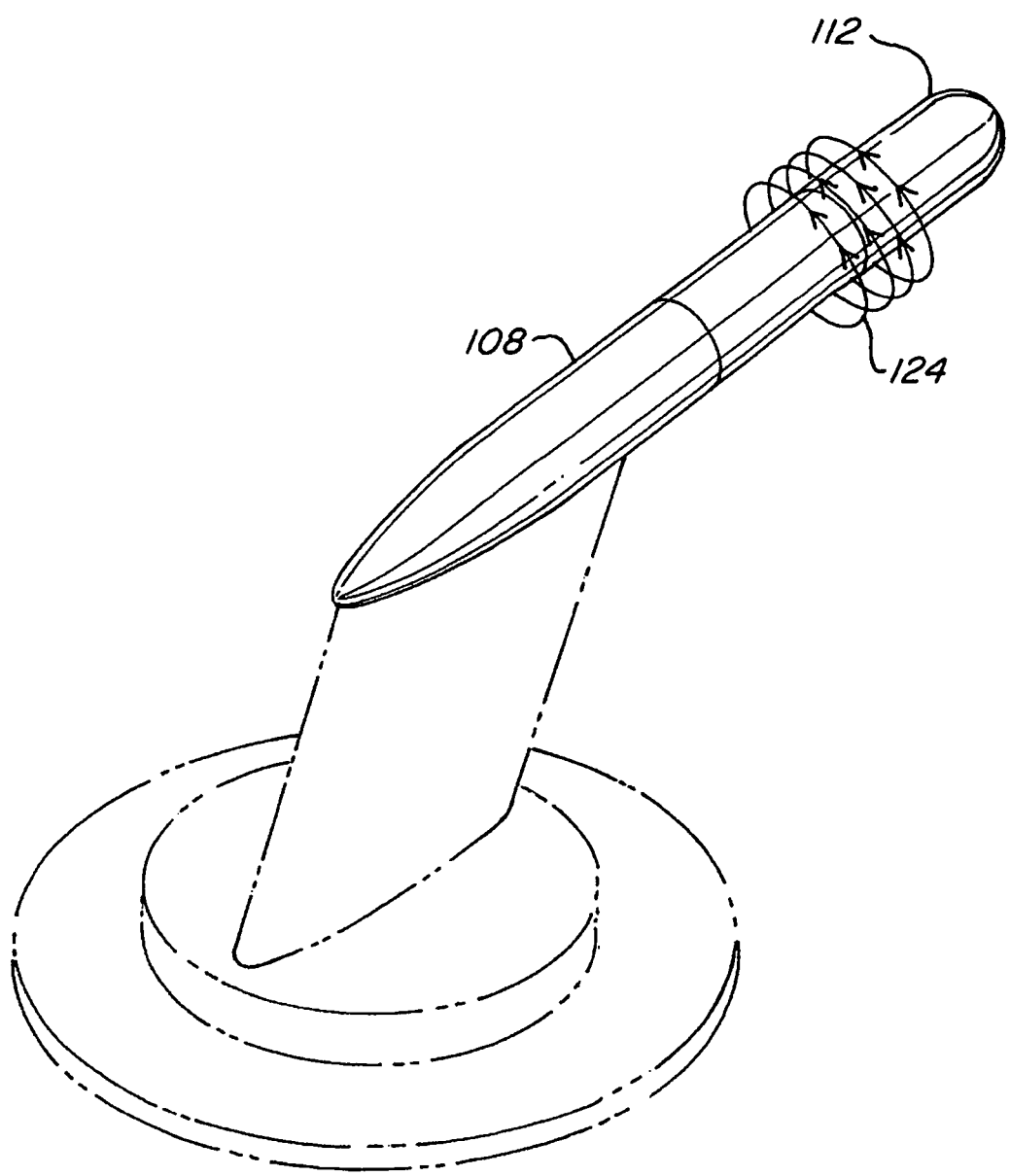
FIG. 11 is a perspective view of the components during the magnetic forming for a fluid sensor assembly in accordance with the present invention of FIG. 1.
Figure 12:
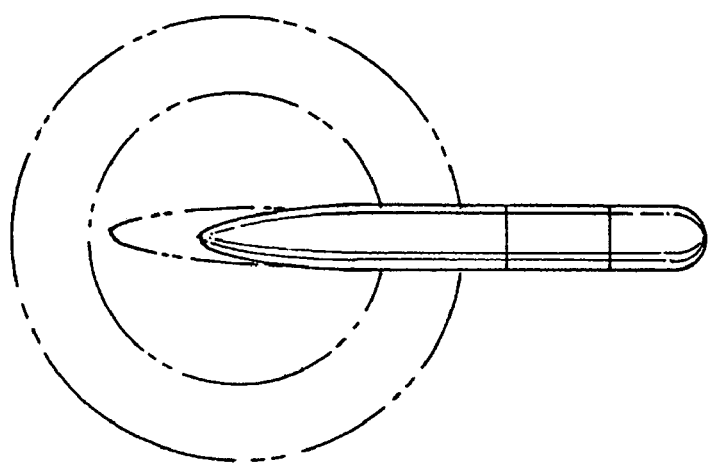
FIG. 12 is a top perspective view of fluid sensor assembly using non-contact forming in accordance with the new design of FIG. 11.
Figure 13:
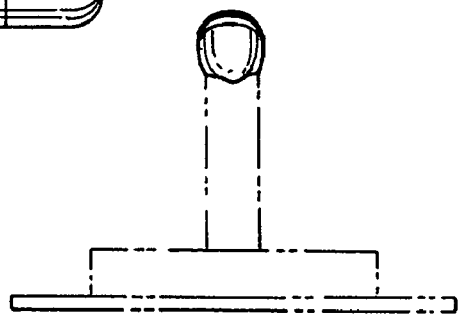
FIG. 13 is a rear view of FIG. 11.
Figure 14:
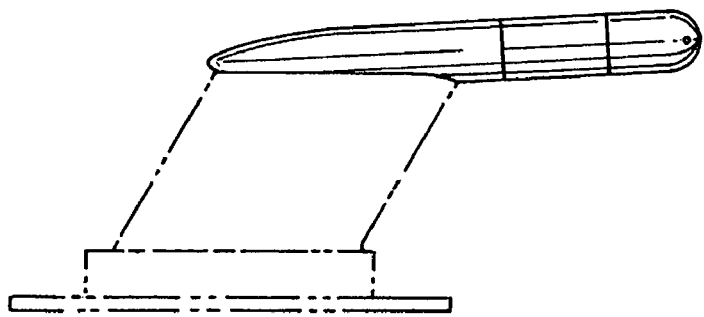
FIG. 14 is a side view of FIG. 11.
Figure 15:
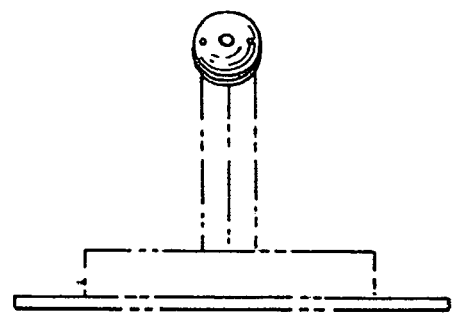
FIG. 15 is a front view of FIG. 11.
Figure 16:
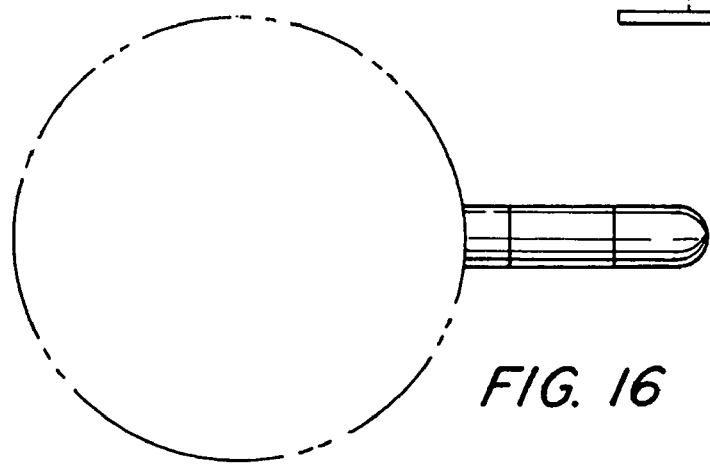
FIG. 16 is a bottom view of FIG. 11.
Figure 17:
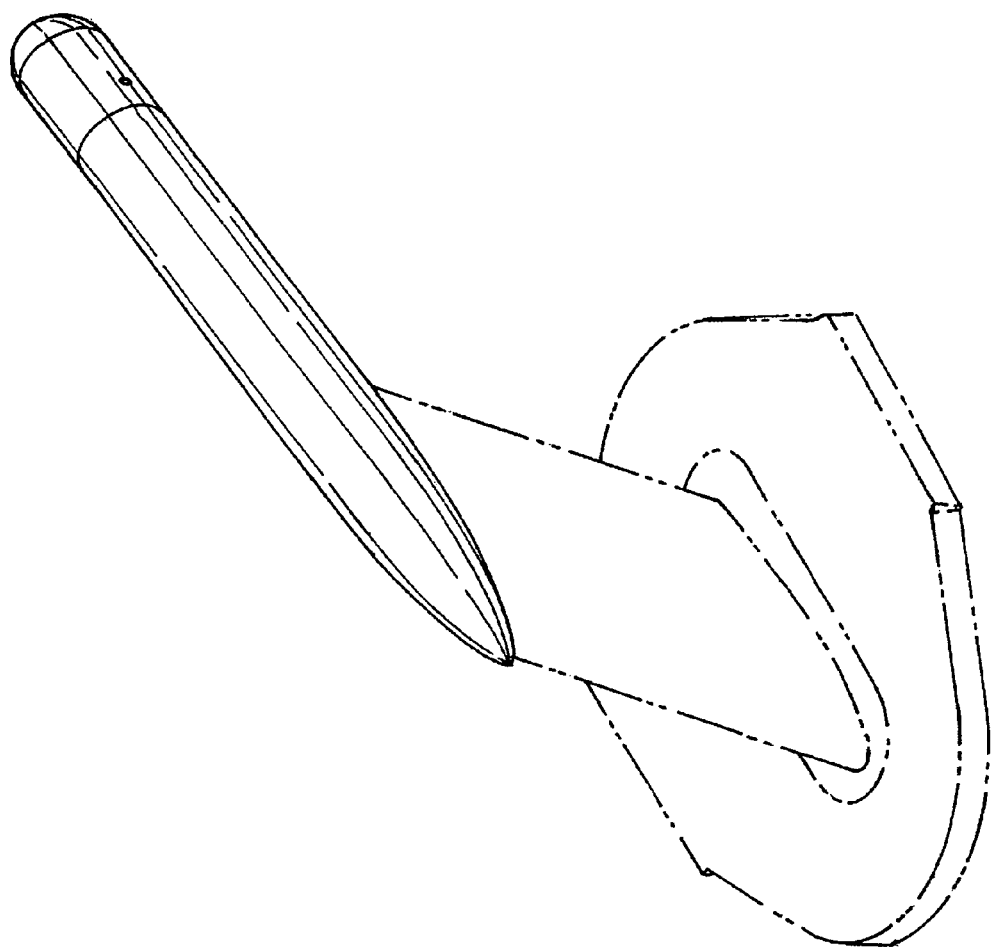
FIG. 17 is an alternative perspective for a fluid sensor assembly in accordance with the present invention of FIG. 1.
Figure 18:
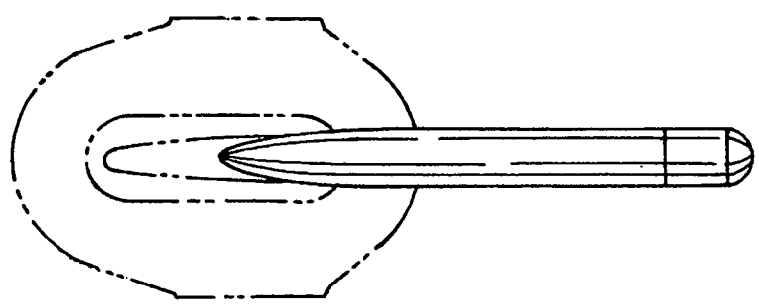
FIG. 18 is a top perspective view of fluid sensor assembly using non-contact forming in accordance with the new design of FIG. 17.
Figure 19:
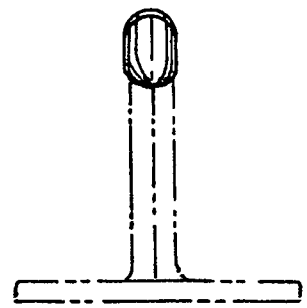
FIG. 19 is a rear view of FIG. 17.
Figure 20:
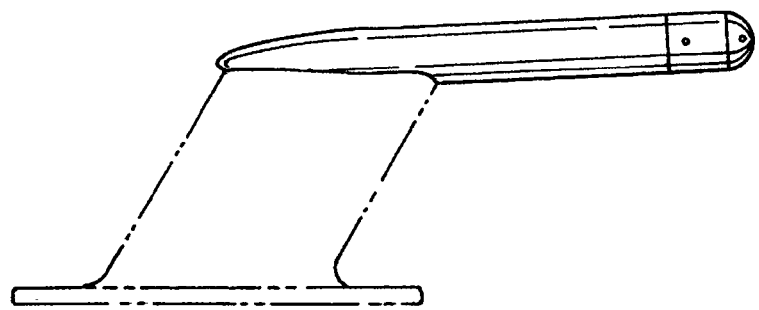
FIG. 20 is a side view of FIG. 17.
Figure 21:
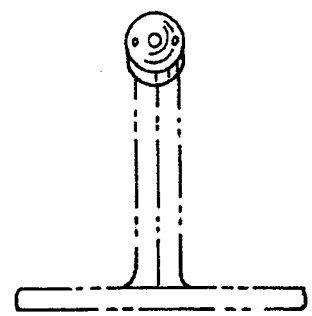
FIG. 21 is a front view of FIG. 17.
Figure 22:
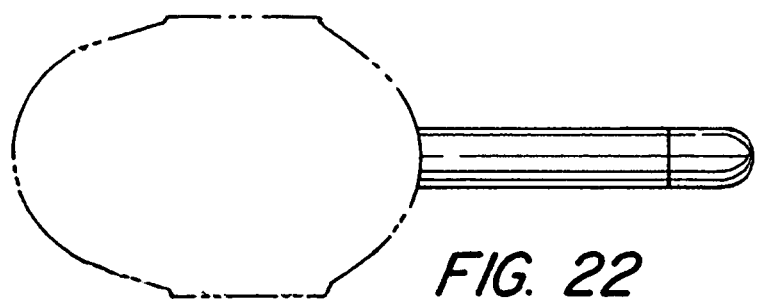
FIG. 22 is a bottom view of FIG. 17.

The overlapping configurations presented by FIGS. 1,2,9 and 10 achieve the same goal and are formed using the same techniques as shown in FIGS. 3 and 11 whereby the forming is enabled by magnetic field 124.

Head section 104's mating surface 116 is introduced to the body portion 100's mating face 120 to form an overlapping configuration as is shown in FIGS. 1 and 9. The overlapping configuration is then magnetically formed using magnetic fields 124 as is shown in FIGS. 3 and 11. Likewise in the alternative embodiment, head section 112's mating face 117 is introduced to the body portion 108's mating surface 121 to form an overlapping configuration as is shown in FIGS. 2 and 10. The overlapping configuration is then magnetically formed using magnetic fields 124 as is shown in FIGS. 3 and 11.

The magnetic forming technique works by discharging a high energy current from a capacitor bank through a forming coil. The high energy current creates an eddy current in the conductive components being exposed to the discharge. The eddy currents produce a magnetic field that repulses magnetic field 124 of the coil. The repulsive force between the two magnetic fields creates pressure that can be used to form the components into a new configuration.

The new configuration is achieved by the magnetic pressure surpassing the components' yield strength thereby causing permanent deformation of the components. The permanent deformation is created by the magnetic pressure causing the components' material structure to enter the plastic region of each component's material structure. Consequently, the resulting deformation has no spring-back thus eliminating the need for adhesives, sealants or mechanical crimps.

FIGS. 3 and 11 represent the products of the forming process. In FIG. 3, body portion 100 is magnetically formed to head section 104 and in FIG. 11, body portion 108 is magnetically formed to head section 112.

The present invention, therefore, provides a method that overcomes the present limitations on the manufacturing of aircraft and other vehicle, e.g. train, boat, hovercraft, car and the like, assemblies with external applications that meet all the varying design criteria that are required. The method satisfies all the following criteria such as increased ease of fabrication, dissimilar material bonding, electrical continuity, higher strength bonding, expanded temperature capabilities, minimized mechanical stresses on parts, extended assembly life cycle, weight reduction, minimized part count and finished parts joining which is not presently possible in any one joinery technique.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for coupling components of a fluid sensor assembly for a vehicle, the method comprising the steps of:
    providing a body portion of a fluid sensor assembly with a mating surface of a first material composition;
    providing a head section of the fluid sensor assembly with a mating face of a second material composition sized to mate with the body portion mating surface, the second material composition being different from the first material composition;
    introducing the mating surface of the body portion to the mating face of the head section to define a overlapping configuration;
    producing a force field by providing a first magnetic field that opposes a second magnetic field; and
    coupling together the mating surface and mating face of the overlapped configuration with the force field to form a fluid sensor assembly by exposing the overlapped configuration to the force field, the force field strength surpassing both mating surface and mating face material yield strength without preheating either the mating surface or mating face.

2. The method of claim 1 further comprising the step of maintaining the electrical continuity of the coupled mating surface and mating face.

3. The method of claim 1 further comprising the step of limiting tool contact of the components to non-mating sections only.

4. The method of claim 1, further comprising the step of maintaining a finish on at least one of the body portion and head section.

5. The method of claim 1 further comprising the step of using components made of dissimilar materials.

6. The method of claim 1 wherein the body portion is aluminum and the head section is stainless steel.

7. The method of claim 1 wherein the fluid sensor assembly comprises a configuration selected from the group consisting of Pitot tube, Pitot and angle of attack sensor, angle of attack sensor, active optical system sensor, air data probe, total air temperature sensor, outside air temperature sensor and combinations of these.

8. A vehicle fluid sensor assembly which comprises:
    a body portion having a mating surface of a first material composition;
    a head section having a mating face of a second material composition, the second material composition being different from the first material composition;
    the mating surface of the body portion introduced to the mating face of the head section to define an overlapped configuration; and
    a force field applied to the overlapped configuration, the force field produced by a first magnetic field that opposes a second magnetic field and the force field strength surpassing both mating surface and mating face material yield strength without preheating either the mating surface or mating face wherein the mating surface and face are coupled by the force field to form a fluid sensor assembly.

9. The apparatus of claim 8 further comprising the body portion made of a first material and the head section made of a second material.

10. The apparatus of claim 9 wherein the body portion is aluminum and the head section is stainless steel.

11. The apparatus of claim 8 further comprising an electrical continuity existing between the coupled mating surface and mating face.

12. The method of claim 1 further comprising the step of using components made of similar materials.

13. The apparatus of claim 8 wherein the fluid sensor assembly comprises a configuration selected from the group consisting of Pitot tube, Pitot and angle of attack sensor, angle of attack sensor, active optical system sensor, air data probe, total air temperature sensor, outside air temperature sensor and combinations of these.

14. The apparatus of claim 8, at least one of the body portion and head section having a finish.

15. A vehicle fluid sensor assembly which comprises:
    a body portion having a mating face of a first material composition;
    a head section having a mating surface of a second material composition, the second material composition being different from the first material composition;
    the mating face of the body portion introduced to the mating surface of the head section to define an overlapped configuration; a first magnetic field and a second magnetic field that opposes the first magnetic field to produce a force field; and
    the mating surface and face coupled by exposing the overlapped configuration to the force field, the force field strength surpassing both mating surface and mating face material yield strength without preheating either the mating surface or mating face to produce a fluid sensor assembly.

16. The product of claim 15 further comprising the body portion made of a first material and the head section made of a second material.

17. The product of claim 16 wherein the body portion is made of an aluminum material and the head section is made of a stainless steel material.

18. The product of claim 15 further comprising an electrical continuity existing between the coupled mating surface and mating face.

19. The product of claim 15 wherein the sensor assembly comprises a configuration selected from the group consisting of Pitot tube, Pitot and angle of attack sensor, angle of attack sensor, active optical system sensor, air data probe, total air temperature sensor, outside air temperature sensor and combinations of these.

20. The apparatus of claim 14, wherein the mating surface and face are coupled by the force field without damaging the finish.

21. The product of claim 15, at least one of the body portion and head section having a finish.

22. The product of claim 21, the mating surface and mating face being coupled without damaging the finish.

* * * * *